United States Patent [19]
Konishi et al.

[11] Patent Number: 5,622,550
[45] Date of Patent: Apr. 22, 1997

[54] YELLOW INK COMPOSITION FOR INK-JET PRINTING AND IMAGE RECORDING METHOD USING THE SAME

[75] Inventors: Akiko Konishi, Yokohama; Kiyofumi Nagai, Machida; Masayuki Koyano, Sagamihara, all of Japan

[73] Assignee: Ricoh Company, Ltd., Tokyo, Japan

[21] Appl. No.: 654,632

[22] Filed: May 29, 1996

[30] Foreign Application Priority Data

May 30, 1995 [JP] Japan ..................... 7-155116

[51] Int. Cl.⁶ ................................. C09D 11/02
[52] U.S. Cl. ........................ 106/22 K; 106/20 D
[58] Field of Search ................. 106/22 K, 20 D; 534/784, 803

[56] References Cited

U.S. PATENT DOCUMENTS

| | | | |
|---|---|---|---|
| 4,605,442 | 8/1986 | Kawashita et al. | 106/22 K |
| 4,647,310 | 3/1987 | Shimada et al. | 106/22 K |
| 4,711,668 | 12/1987 | Shimada et al. | 106/22 K |
| 4,793,860 | 12/1988 | Murakami et al. | 106/22 K |
| 5,395,434 | 3/1995 | Tochihara et al. | 106/22 H |
| 5,397,386 | 3/1995 | Nakazawa et al. | 106/22 K |
| 5,431,720 | 7/1995 | Nagai et al. | 106/22 R |
| 5,462,592 | 10/1995 | Murakami et al. | 106/22 H |
| 5,482,546 | 1/1996 | Eida | 106/22 K |
| 5,514,208 | 5/1996 | Nagai et al. | 106/22 H |

FOREIGN PATENT DOCUMENTS

| | | | |
|---|---|---|---|
| 102972 | 6/1982 | Japan | 106/22 K |
| 8775 | 1/1984 | Japan | 106/22 K |

*Primary Examiner*—Helene Klemanski
*Attorney, Agent, or Firm*—Cooper & Dunham LLP

[57] ABSTRACT

A yellow ink composition for ink jet printing is composed of an aqueous solution which includes a water-soluble dye which containing (a) a dye compound of formula (I),

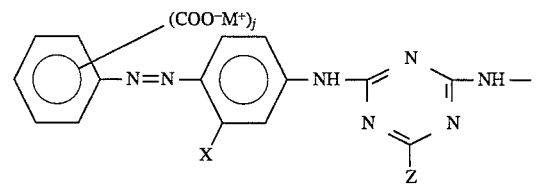

-continued

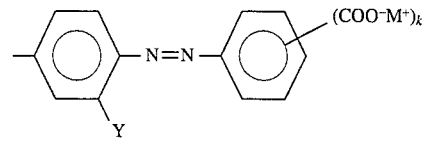

and (b) at least one of a dye compound of formula (II)

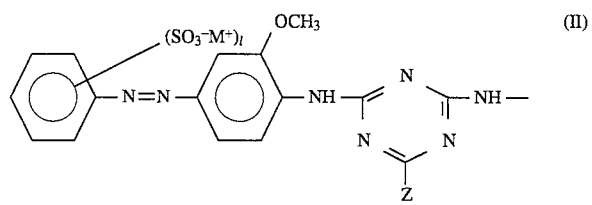

or a dye compound of formula (III)

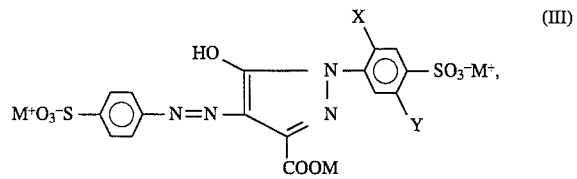

a surfactant, and a wetting agent. By use of this ink composition, a method of forming images on an image receiving medium is performed which includes the step of ejecting the aqueous ink composition in the form of droplets by the application of thermal or mechanical energy thereto onto an image receiving medium with a Stöckigt size degree of 3 seconds or more.

31 Claims, No Drawings

YELLOW INK COMPOSITION FOR INK-JET PRINTING AND IMAGE RECORDING METHOD USING THE SAME

BACKGROUND OF THE INVENTION

1. Field of the Invention

The present invention relates to a yellow ink composition for ink-jet printing, capable of producing images with excellent color tone and high density, free from image blurring, and also with excellent water resistance, light-resistance, preservation stability, ink ejection stability and drying characteristics. The present invention also relates to a method of recording images by use of such a yellow ink composition.

2. Discussion of Background

Generally, an aqueous ink composition for use in ink-jet printing comprises as constituent components a dye, a wetting agent and water.

As the dyes for use in such aqueous ink compositions, there are known acid dyes, direct dyes and basic dyes. However, of such dyes, basic dyes are not used so much in an aqueous ink composition for ink-jet printing. Instead, direct dyes or acid dyes are primarily employed in view of sufficient safety and preservation stability thereof for use in practice.

In conventional inks for ink-jet printing, as direct dyes, for example, C.I. Direct Yellow 1, 8, 12, 24, 26, 33, 44, 50, 86, 120, 132 and 144 are employed; and as acid dyes, for example, C.I. Acid Yellow 17, 42, 44, 79 and 142 are employed.

However, when an ink composition containing such a direct dye is used in ink Jet printing, there are caused various problems which stem from poor preservation and ejection stabilities of the ink composition.

More specifically, precipitates are formed in the ink composition or the physical properties of the ink compositions change during an extended period of storage, or while in continuous use or not in use in an ink-jet printing apparatus, an the nozzles of the ink jet printing apparatus are clogged with the ink composition during the periods of use and non-use thereof, because of the poor solubility of the direct dye in the ink composition.

Many acid-dye-containing ink compositions are capable of yielding excellent color tone, but images formed or recorded by acid-dye containing ink compositions have poor water resistance and light-resistance and therefore lack preservability.

For example, Japanese Laid-Open Patent Application 2-233781 discloses an ink composition which employs a direct dye, C.I. Direct Yellow 86, for ink jet printing, attempting to improve the color reproduction performance thereof. However, the preservation stability and ejection stability of the ink composition are insufficient and lacks reliability for use in practice.

A dye of the following general formula, including a counter ion, —NH₄ represented by M, which is intended to improve the water resistance thereof, was proposed by R. W. Kenyon of ZENECA Co., Ltd. at the 9th International Congress on Advances in Non-Impact Printing technologies/ JAPAN HARDCOPY '93:

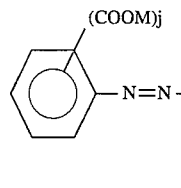 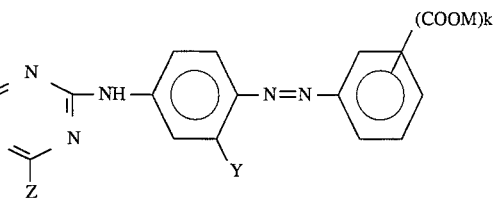

When an ink composition containing the above dye is employed for ink jet printing, images with excellent color tone and water resistance can be produced, but the image density thereof is low, and the preservation stability and ink ejection stability of the ink composition are insufficient for use in practice and therefore the ink composition lacks operational reliability.

In order to obtain recorded images with high image density, it is necessary to increase the concentration of a dye in an ink composition for ink jet printing. In order to increase the concentration of a dye in an ink composition, it is necessary that the solubility of the dye in the ink composition be high.

The solubility of the dye in the ink composition has significant effects on the preservation stability and ejection stability of the ink composition.

Dyes used in conventional ink compositions for ink jet printing do not have high solubility and dissolving stability, and therefore such conventional ink compositions are not capable of recording images with high density, excellent color tone, high water resistance and light-resistance, and do no have excellent preservation stability and ejection stability.

Furthermore, surfactants are added to conventional ink compositions for ink jet printing in order to improve the drying rate of images printed by the ink compositions. Such surfactants have the functions of decreasing the surface tension of the ink compositions and therefore increasing the penetration of the ink compositions into image receiving paper, thereby increasing the drying rate of the printed images.

Japanese Laid-Open Potent Application 55-29546 discloses an ink composition which comprises a surfactant. In this ink composition, by use of a surfactant, the penetration of the ink composition into paper is increased, thereby increasing the drying rate of images printed on paper. However, this ink composition has the shortcoming that printed images considerably spread on some paper so that image quality is significantly lowered.

Japanese Patent Publication 80-23793 discloses an ink composition which comprises a dialkylsulfosuccinate as a surfactant for improving the drying rate of printed images and minimizing the deterioration of printed images. However, when sodium dioctylsulfo-succinate or sodium dihexylsulfosuccinate is used as the surfactant, the diameters of picture elements of printed images vary on some paper, and when the pH of the ink composition is on an alkaline side, such a surfactant may be decomposed, and therefore the effect of such a surfactant will be lost when preserved for an extended period of time.

Japanese Laid-Open Patent Application 56-57862 discloses an ink composition comprising a strong basic material for improving the drying rate of printed images. Such an ink composition is effective for the improvement of the penetration of the ink into a rosin-sized acidic paper, but not effective for a paper sized with an alkyl ketene dimer or alkenyl sulfosuccinic acid.

Furthermore, even in the case of the acidic paper, the above-mentioned ink composition is not effective for a two-color-superimposed portion thereof.

Japanese Laid-Open Patent Application 1-203483 discloses an ink composition comprising a polyhydric alcohol derivative and pectin in an attempt to increase the drying rate of the ink composition and to prevent the blurring of the ink composition on paper, thereby obtaining recording images with excellent image quality. However, when this ink composition is used in an ink-jet printer, the ejection of the ink composition from the nozzles of the printer is unstable when the printing operation is resumed after some intermission, because pectin is a nonionic material having hydroxyl groups as hydrophilic groups and has poor water solubility.

Thus, it is extremely difficult to improve the drying rate of printed images, without impairing the ejection stability, while preventing the blurring of printed images and obtaining recorded images with excellent image quality, by conventional ink compositions for ink jet printing.

In order to perform excellent ink jet printing over a long period of time, it is required that an ink composition for ink-jet printing satisfy the following conditions:

(1) The viscosity, surface tension, specific electric conductivity and density of the ink composition fall within certain appropriate respective ranges which are suitable for an ink droplet formation method and a method of controlling the direction of ejected ink droplet streams employed. Thus, the ejection characteristics the ink composition are excellent.

(2) The preservation stability of the ink composition is so good that no precipitates are separated or formed, due to chemical changes or other causes, from the ink composition during an extended period of storage, or during the periods when an ink jet printing apparatus is in continuous use, or not in use, and no physical properties of the ink composition change during the above-mentioned periods.

(3) The ejection stability of the ink composition is so good that the direction of the ejected ink droplet streams is not shifted from a predetermined direction and the weight of each ink composition droplet is not changed during continuous ejection for recording by an ink jet printing apparatus, or when ink jet printing is resumed after a non-use period, and that the nozzles of the ink jet printing apparatus are not plugged with the ink composition.

(4) Images printed by the ink composition have excellent color tone and sufficiently high density and are clear and free from blurring.

(5) Images printed by the ink composition dry rapidly.

(6) Images printed by the ink composition are sufficiently resistant to water, light and physical wear for use in practice.

However, conventionally it is difficult to obtain an ink composition for ink jet printing, particularly, a yellow ink composition for ink jet printing, which is capable of producing recorded images with excellent color tone, water resistance, and light-resistance, and with high image density, and improved drying rate, free from blurring, and which has excellent preservation stability and ejection stability.

SUMMARY OF THE INVENTION

Accordingly, it is therefore a first object of the present invention to provide a yellow ink composition for ink-jet printing, which is capable of producing recorded images with excellent color tone, water resistance, and light-resistance, and with high image density, and improved drying rate, free from blurring, and which has excellent preservation stability and ejection stability.

A second object of the present invention is to provide a method of recording images by use of the above-mentioned yellow ink composition.

The first object of the present invention can be achieved by a yellow ink composition for ink jet printing comprising an aqueous solution which comprises:

a water-soluble dye which comprises (a) a dye compound of formula (I),

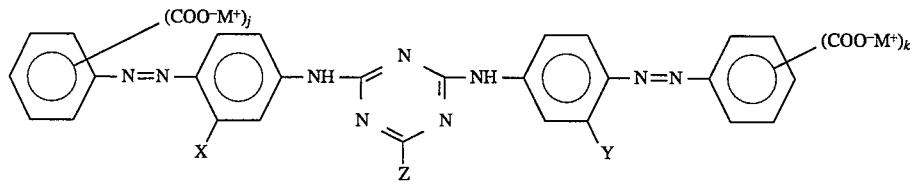

wherein X and Y are each selected from the group consisting of a hydrogen atom, an alkyl group, an alkoxyl group and a halogen; Z is an alkanolamine group; $M^+$ is selected from the group consisting of an alkali metal cation, a quaternary ammonium cation, a quaternary phosphonium cation, and an alkanol amine cation; and j and k are each an integer of 0 to 3, and (b) at least one of a dye compound of formula (II)

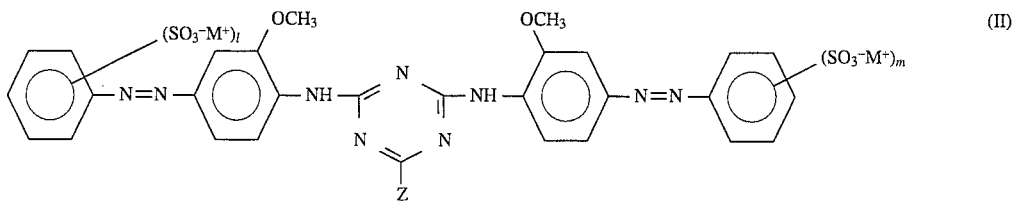

wherein Z and $M^+$ are respectively the same; and l and m are each an integer of 0 to 3, or a dye compound of formula (III)

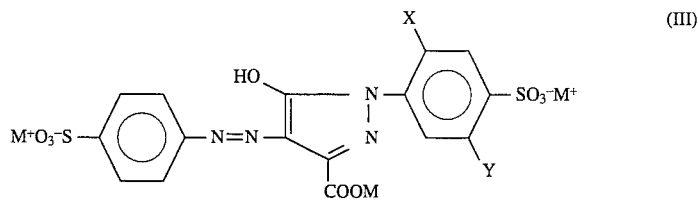

wherein X, Y and $M^+$ are respectively the same as in formula (I), a surfactant, and a wetting agent.

In the above-mentioned yellow ink composition of the present invention, the alkali metal cation represented by $M^+$ may be a cation selected from the group consisting of $Na^+$ and $Li^+$.

Furthermore, in the yellow ink composition of the present invention, the quaternary ammonium cation represented by $M^+$ may be a cation represented by formula (1):

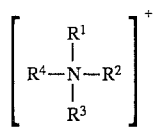

wherein $R^1$ to $R^4$ each is selected from the group consisting of a hydrogen atom, an alkyl group having 1 to 4 carbon atoms, and a halogenated alkyl group having 1 to 4 carbon atoms.

Furthermore, in the yellow ink composition of the present invention, the alkanolamine cation represented by $M^+$ may be a cation represented by formula (2):

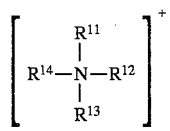

wherein at least one of $R^{11}$ to $R^{14}$ is a hydroxyl alkyl group having 1 to 4 carbon atoms, and the other is selected from the group consisting of a hydrogen atom, an alkyl group having 1 to 4 carbon atoms, and a halogenated alkyl group having 1 to 4 carbon atoms.

In the yellow ink composition of the present invention, the quaternary phosphonium cation represented by $M^+$ may be a cation represented by formula (3):

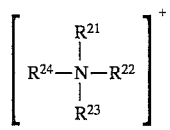

wherein $R^{21}$ to $R^{24}$ each is selected from the group consisting of a hydrogen atom, an alkyl group having 1 to 4 carbon atoms, a hydroxy alkyl group having 1 to 4 carbon atoms, and a halogenated alkyl group having 1 to 4 carbon atoms.

In the yellow ink composition of the present invention, when the dye compound of formula (III) is employed, it is preferable that the amount thereof be 30 wt. % or less of the entire weight of the water-soluble dye.

In the yellow ink composition of the present invention, the surfactant may be selected from the group consisting of a polyoxyethylene alkyl ether acetate of formula (IV), $$RO(CH_2CH_2O)_nCH_2COO^-M^{+\prime} \quad (IV)$$

wherein R a straight-chain or branched alkyl group having 13 to 14 carbon atoms, $M^{+\prime}$ is an alkali metal cation, a quaternary ammonium cation, a quaternary phosphonium cation or an alkanolamine cation, and n is an integer of 3 to 12; and a dialkylsulfosuccinate of formula (V),

wherein R' is a straight-chain or branched alkyl group having 5 to 7 carbon atoms, and $M^{+\prime}$ is the same as defined in formula (IV).

$M^{+\prime}$ may be the same cation as previously defined in formula (1), (2) or (3).

As the surfactant for use in the yellow ink composition of the present invention, there can be employed a compound of formula (VI),

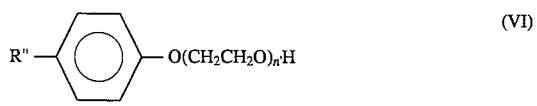

wherein R" is a straight-chain or branched alkyl group having 6 to 14 carbon atoms, and n' is an integer of 5 to 12; or a compound of formula (VII),

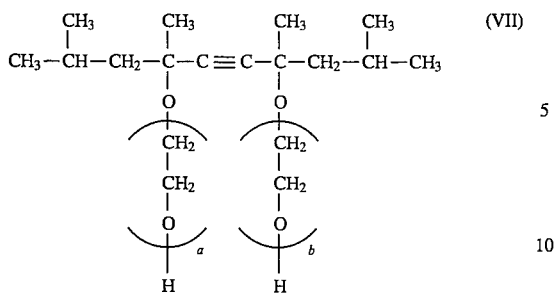

wherein a and b are each an integer of 0 to 40.

The above yellow ink composition may further comprise at least one of urea or a urea derivative.

In the yellow ink composition of the present invention, the wetting agent may comprise triethylene glycol in an amount of 1 to 80 wt. % of the entire weight of the wetting agent.

It is preferable that the yellow ink composition of the present invention have a pH of 7 to 11.

A second object of the present invention can be achieved by a method of recording images on an image receiving medium, comprising the step of ejecting the above-mentioned yellow ink composition in the form of droplets by the application of thermal or mechanical energy thereto onto an image receiving medium with a Stöckigt size degree of 3 seconds or more.

DESCRIPTION OF THE PREFERRED EMBODIMENTS

A yellow ink composition for ink jet printing of the present invention comprises an aqueous solution comprising:

a water-soluble dye which comprises (a) a dye compound of formula (I),

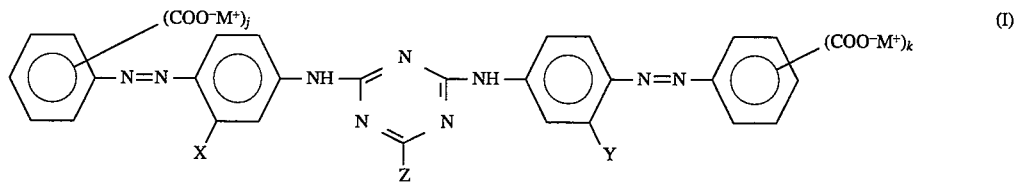

wherein X and Y are each selected from the group consisting of a hydrogen atom, an alkyl group, an alkoxyl group and a halogen; Z is an alkanolamine group; $M^+$ is selected from the group consisting of an alkali metal cation, a quaternary ammonium cation, a quaternary phosphonium cation, and an alkanolamine cation; and j and k are each an integer of 0 to 3, and (b) at least one of a dye compound of formula (II)

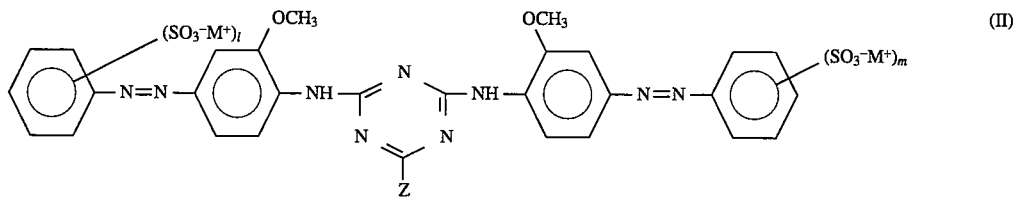

wherein Z and $M^+$ are respectively the same; and l and m are each an integer of 0 to 3, or a dye compound of formula (III),

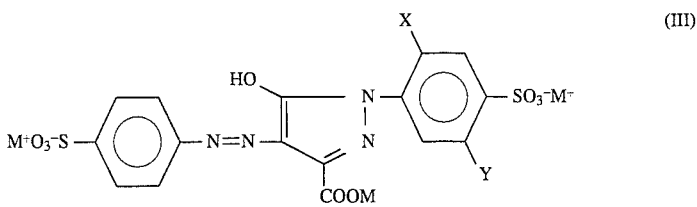
(III)

wherein X, Y and M⁺ are respectively the same as in formula (I), a surfactant, and a wetting agent.

In the above yellow ink composition, the alkali metal cation represented by $M^+$ may be a cation selected from the group consisting of $Na^+$ and $Li^+$; the quaternary ammonium cation represented by $M^+$ may be a cation represented by formula (1):

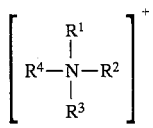  (1)

wherein $R^1$ to $R^4$ each is selected from the group consisting of a hydrogen atom, an alkyl group having 1 to 4 carbon atoms, and a halogenated alkyl group having 1 to 4 carbon atoms; the alkanolamine cation represented by $M^+$ may be a cation represented by formula (2):

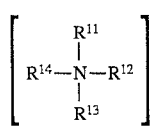  (2)

wherein at least one of $R^{11}$ to $R^{14}$ is a hydroxyl alkyl group having 1 to 4 carbon atoms, and the other is selected from the group consisting of a hydrogen atom, an alkyl group having 1 to 4 carbon atoms, and a halogenated alkyl group having 1 to 4 carbon atoms; and the quaternary phosphonium cation represented by $M^+$ may be a cation represented by formula (3):

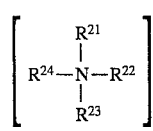  (3)

wherein $R^{21}$ to $R^{24}$ each is selected from the group consisting of a hydrogen atom, an alkyl group having 1 to 4 carbon atoms, a hydroxy alkyl group having 1 to 4 carbon atoms, and a halogenated alkyl group having 1 to 4 carbon atoms.

When $M^+$ is the above-mentioned alkali metal cation such as $Na^+$ and $Li^+$, the quaternary ammonium cation, the alkanolamine cation, or the quaternary phosphonium cation, the water-soluble stability, preservation stability and ejection stability of the yellow ink composition are significantly improved, so that highly reliable ink jet printing can be performed to produce excellent recorded images.

In the yellow ink composition of the present invention, when the dye compound of formula (I) and the dye compound of formula (II) are used in combination, it is preferable that the amount of the dye compound of formula (I) be in the range of 50 to 90 wt. % of the entire weight of the water-soluble dye, and the amount of the dye compound of formula (II) be in the range of 50 to 10 wt. % of the entire weight of the water-soluble dye.

When the dye compound of formula (I) and the dye compound of formula (III) are used in combination, it is preferable that the amount of the dye compound of formula (I) be in the range of 70 to 95 wt. % of the entire weight of the water-soluble dye, and the amount of the dye compound of formula (III) be in the range of 30 to 5 wt. % of the entire weight of the water-soluble dye.

When the dye compound of formula (I), the dye compound of formula (II) and the dye compound of formula (III) are used in combination, it is preferable that the amount of the dye compound of formula (I) be in the range of 50 to 90 wt. % of the entire weight of the water-soluble dye, the amount of formula (II) be in the range of 45 to 1 wt. %, and the amount of the dye compound of formula (III) be in the range of 5 to 9 wt. % of the entire weight of the water-soluble dye.

When the dye compound of formula (I) and the dye compound of formula (II) and/or the compound of formula (III) are employed in the above respective amount ranges, the water-soluble stability, preservation stability and ejection stability of the yellow ink composition can be significantly improved, so that highly reliable ink jet printing can be performed to produce recorded images which are particularly excellent with respect to color tone, water resistance and light resistance.

In particular, when the dye compound of formula (I) and the dye compound of formula (II) are used in combination, and the amount of the dye compound of formula (II) is 10 wt. % or more, the water solubility of the yellow ink composition can be significantly improved.

When the dye compound of formula (III) is employed, if the amount thereof exceeds 30 wt. % of the entire weight of the water-soluble dye, the water resistance of printed images tends to be degraded. Therefore, it is preferable that the amount of the dye compound of formula (III) be 30 wt. % or less.

In the yellow ink composition of the present invention, an anionic surfactant and a nonionic surfactant can be employed.

As an anionic surfactant, it is preferable to employ a polyoxyethylene alkyl ether acetate of formula (IV), $$RO(CH_2CH_2O)_nCH_2COO^-M^{+\prime} \qquad (IV)$$

wherein R is a straight-chain or branched alkyl group having 13 to 14 carbon atoms, $M^{+\prime}$ is an alkali metal cation, a quaternary ammonium cation, a quaternary phosphonium cation or an alkanolamine cation, and n is an integer of 3 to 12; or a dialkylsulfosuccinate of formula (V),

wherein R' is a straight-chain or branched alkyl group having 5 to 7 carbon atoms, and $M^{+\prime}$ is the same as defined in formula (IV).

As the polyoxyethylene alkyl ether acetate of formula (IV), a polyoxyethylene alkyl ether acetate of formula (IV) in which R is an alkyl group having 13 carbon atoms and n is 3, is preferable for use in the present invention.

Furthermore, as the dialkylsulfosuccinate of formula (V), a dialkylsulfosuccinate of formula (V) in which R' is a straight-chain or branched alkyl group having 5 or 7 carbon atoms is preferable for use in the present invention.

By the addition of the above-mentioned polyoxyethylene alkyl ether acetate or dialkylsulfosuccinate to the yellow ink composition, the surface tension of the ink composition can be decreased, whereby the penetration performance of the ink composition into paper can be increased, so that when printing is performed by the above-mentioned polyoxyethylene alkyl ether acetate or dialkylsulfosuccinate containing yellow ink composition, for instance, on a sheet of pain paper, the drying rate of the printed images is high and the image quality thereof is also high.

It is preferable that the surface tension of the ink composition be adjusted to 50 mN/m or less, more preferably to 40 mN/m or less by the addition of such an anionic surfactant thereto.

In the present invention, it is preferable that such an anionic surfactant be employed in an amount in the range of 0.01 to 3.0 wt. % of the entire weight of the yellow ink composition.

When the amount of the anionic surfactant is less than 0.01 wt. %, the surface tension of the ink composition tends not to be decreased sufficiently and therefore the drying rate of printed images will be low; while when the amount of the anionic surfactant is more then 3.0 wt. %, the surfactant tends to be precipitated during an extended period of storage.

Furthermore, since the dialkylsulfosuccinate may be decomposed when allowed to stand under an alkaline condition, it is preferable that the pH of the ink composition be appropriately adjusted.

In the above-mentioned anionic surfactants, the alkali metal cation represented by $M^{+'}$ may be a cation selected from the group consisting of $Na^+$ and $Li^+$; the quaternary ammonium cation represented by $M^{+'}$ may be a cation represented by formula (1):

wherein $R^1$ to $R^4$ each is selected from the group consisting of a hydrogen atom, an alkyl group having 1 to 4 carbon atoms, and a halogenated alkyl group having 1 to 4 carbon atoms; the alkanolamine cation represented by $M^{+'}$ may be a cation represented by formula (2):

wherein at least one of $R^{11}$ to $R^{14}$ is a hydroxyl alkyl group having 1 to 4 carbon atoms, and the other is selected from the group consisting of a hydrogen atom, an alkyl group having 1 to 4 carbon atoms, and a halogenated alkyl group having 1 to 4 carbon atoms; and the quaternary phosphonium cation represented by $M^{+'}$ may be a cation represented by formula (3):

wherein $R^{21}$ to $R^{24}$ each is selected from the group consisting of a hydrogen atom, an alkyl group having 1 to 4 carbon atoms, a hydroxy alkyl group having 1 to 4 carbon atoms, and a halogenated alkyl group having 1 to 4 carbon atoms.

When $M^{+'}$ in the surfactants is the above-mentioned alkali metal cation such as $Na^+$ and $Li^+$, the quaternary ammonium cation, the alkanolamine cation, or the quaternary phosphonium cation, the water-soluble stability, preservation stability and ejection stability of the yellow ink composition are significantly improved, so that highly reliable ink jet printing can be performed in a stable manner, and therefore printed images with high image quality and minimum blurring can be obtained at high drying rate.

As a nonionic surfactant, it is preferable to employ a polyxethylene alkylphenyl ether of formula (VI),

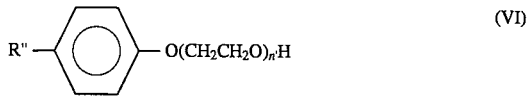

wherein R" is a straight-chain or branched alkyl group having 6 to 14 carbon atoms, and n' is an integer of 5 to 12; or an acetylene glycol derivative compound of formula (VII),

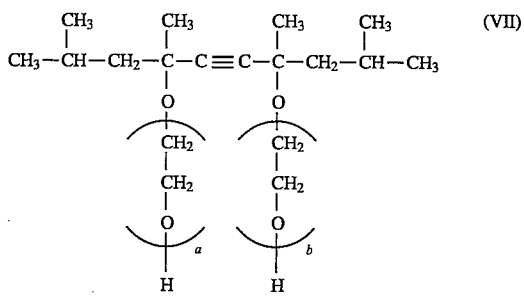

wherein a and b are each an integer of 0 to 40.

By the addition of the above-mentioned polyxethylene alkylphenyl ether of formula (VI) or acetylene glycol derivative compound of formula (VII) to the yellow ink composition, the surface tension of the ink composition can be decreased, whereby the penetration performance of the ink composition into paper and the wetting performance of the ink composition to the paper can be increased, so that when printing is performed by the above-mentioned polyxethylene alkylphenyl ether or acetylene glycol derivative compound containing yellow ink composition, for instance, on a sheet of pain paper, the drying rate of the printed images is high and the printed images have high image quality with minimum spreading of the images.

Furthermore, by use of these surfactants in combination with the water-soluble dye for use in the present invention, the deterioration of the printed images can be minimized.

In the present invention, it is preferable that such a nonionic surfactant be employed in an amount in the range of 0.01 to 3.0 wt. % of the entire weight of the yellow ink composition.

When the amount of the anionic surfactant is less than 0.01 wt. %, the surface tension of the ink composition tends not to be decreased sufficiently and therefore the drying rate of printed images wall be low; while when the amount of the anionic surfactant is more than 3.0 wt. %, the surfactant tends to be precipitated during an extended period of storage.

Furthermore, when urea or a urea derivative such as hydroxyethyl urea or dihydroxyethyl urea is added to the above-mentioned polyxethylene alkylphenyl ether or acetylene glycol derivative compound surfactant, the interaction between the dyes and the nonionic surfactant is weakened, add the association of the dye molecules is loosened, whereby the penetration performance, ejection stability and extended preservation stability of the aqueous ink composition can be significantly improved.

It is preferable that urea or such a urea derivative be added to the yellow ink composition in an amount in the range of 0.1 wt. % to 5 wt. % of the entire weight of the ink composition in order to obtain the effect thereof sufficiently, without changing the viscosity thereof when water is evaporated from the aqueous ink composition.

In order to impart solubility stability to the water-soluble dyes and the surfactants for use in the present invention during the preservation of the yellow ink composition of the present invention, or in order to increase the ejection stability when ejecting the ink composition in the form of droplets for recording with the application of thermal energy to the ink composition, it is preferable that the counter ions for the water-soluble dyes and the surfactants for use in the present invention be a cation selected from the group consisting of lithium cation, sodium cation, the previously mentioned quaternary ammonium cation, alkanolamine cation, and quaternary phosphonium cation.

For example, a water-soluble dye or surfactant in the form of a lithium salt is produced by adding lithium hydroxide to a free acid corresponding to the water-soluble dye or surfactant.

For the formation of the quaternary ammonium cations of formula (1), alkanolamine cations of formula (2), and phosphonium cations of formula (3), for example, the following hydroxides as shown in TABLE 1 can be employed:

TABLE 1

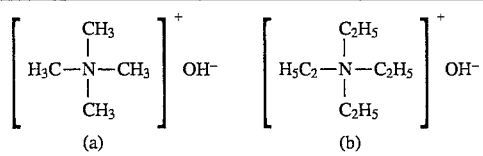

TABLE 1-continued

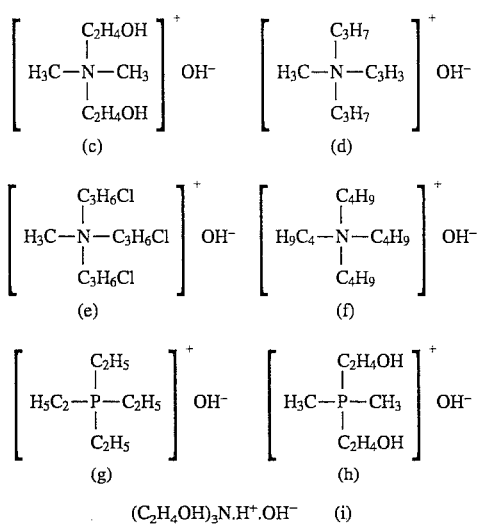

However, it is not always required that all of the counter ions for the water-soluble dyes and the surfactants for use in the present invention be a cation selected from the group consisting of lithium cation, sodium cation, the previously mentioned quaternary ammonium cation of formula (1), alkanolamine cation of formula (2), and quaternary phosphonium cation of formula (3). Other alkali ions may also be added thereto.

TABLE 2 shows representative examples of the dye compound of formula (I) for use in the present invention:

TABLE 2

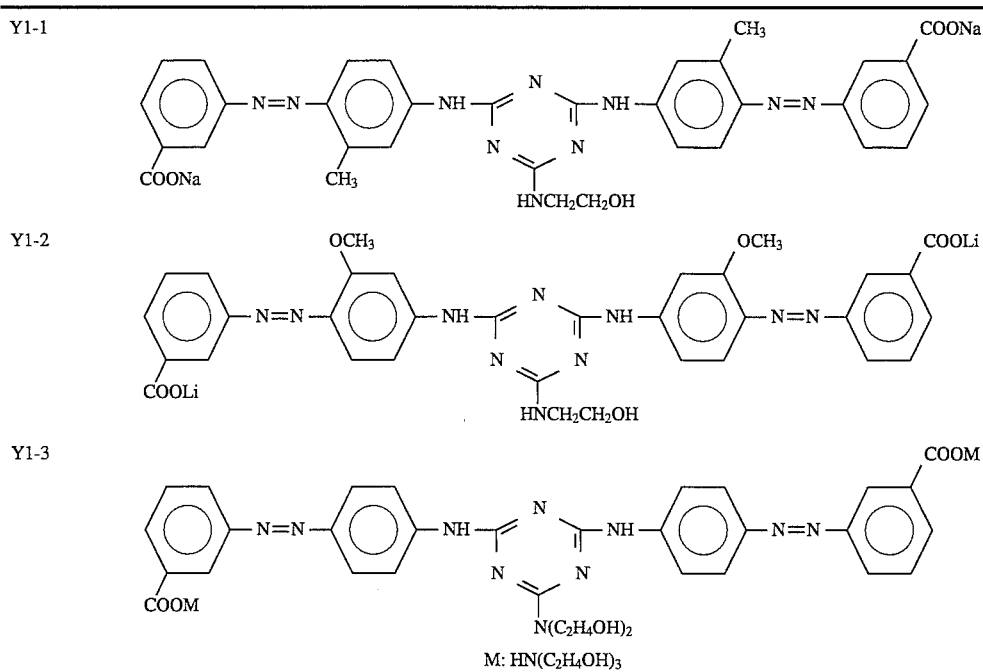

TABLE 2-continued
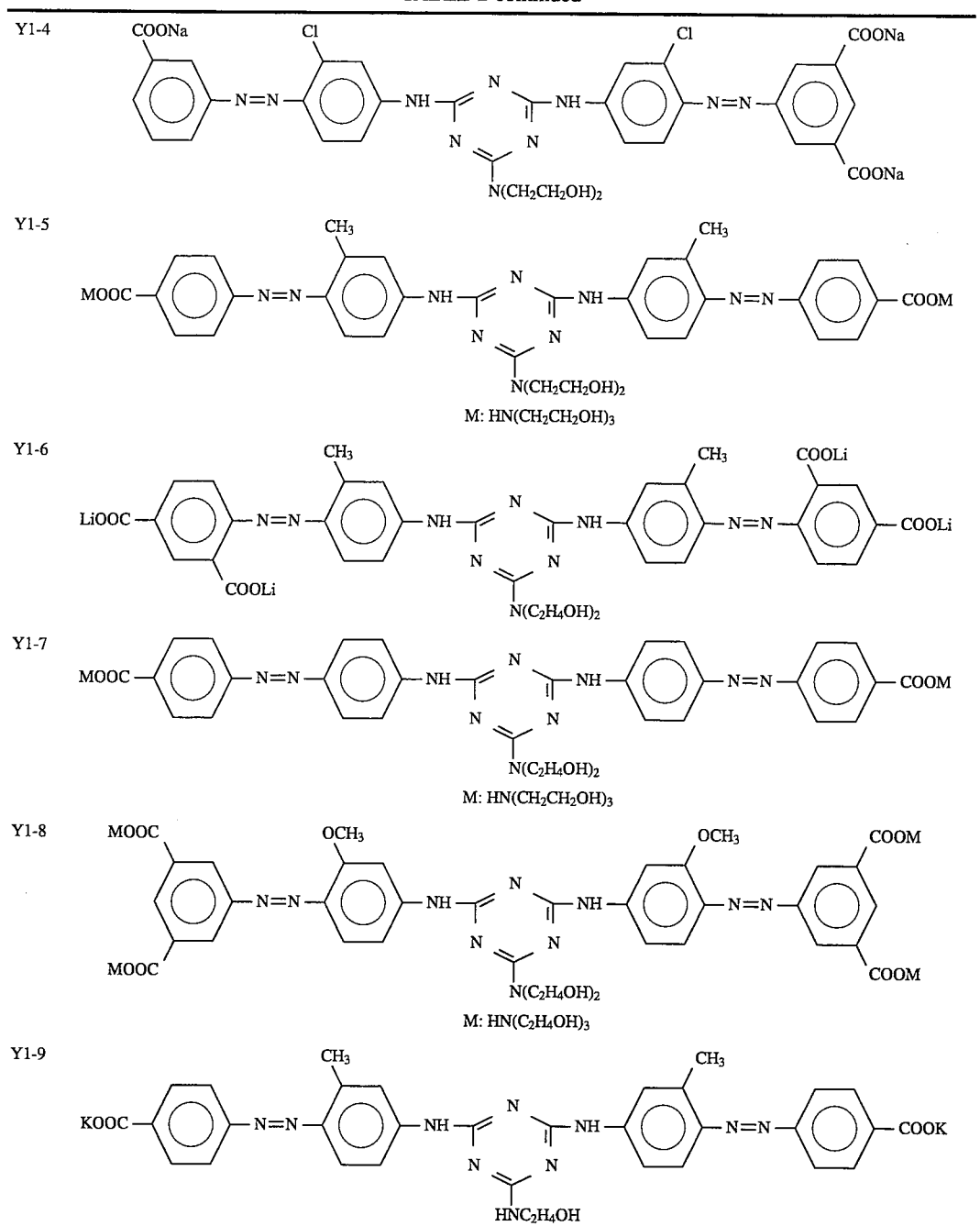
TABLE 3 shows representative example of dye compounds of formula (II) for use in the present invention:

TABLE 3
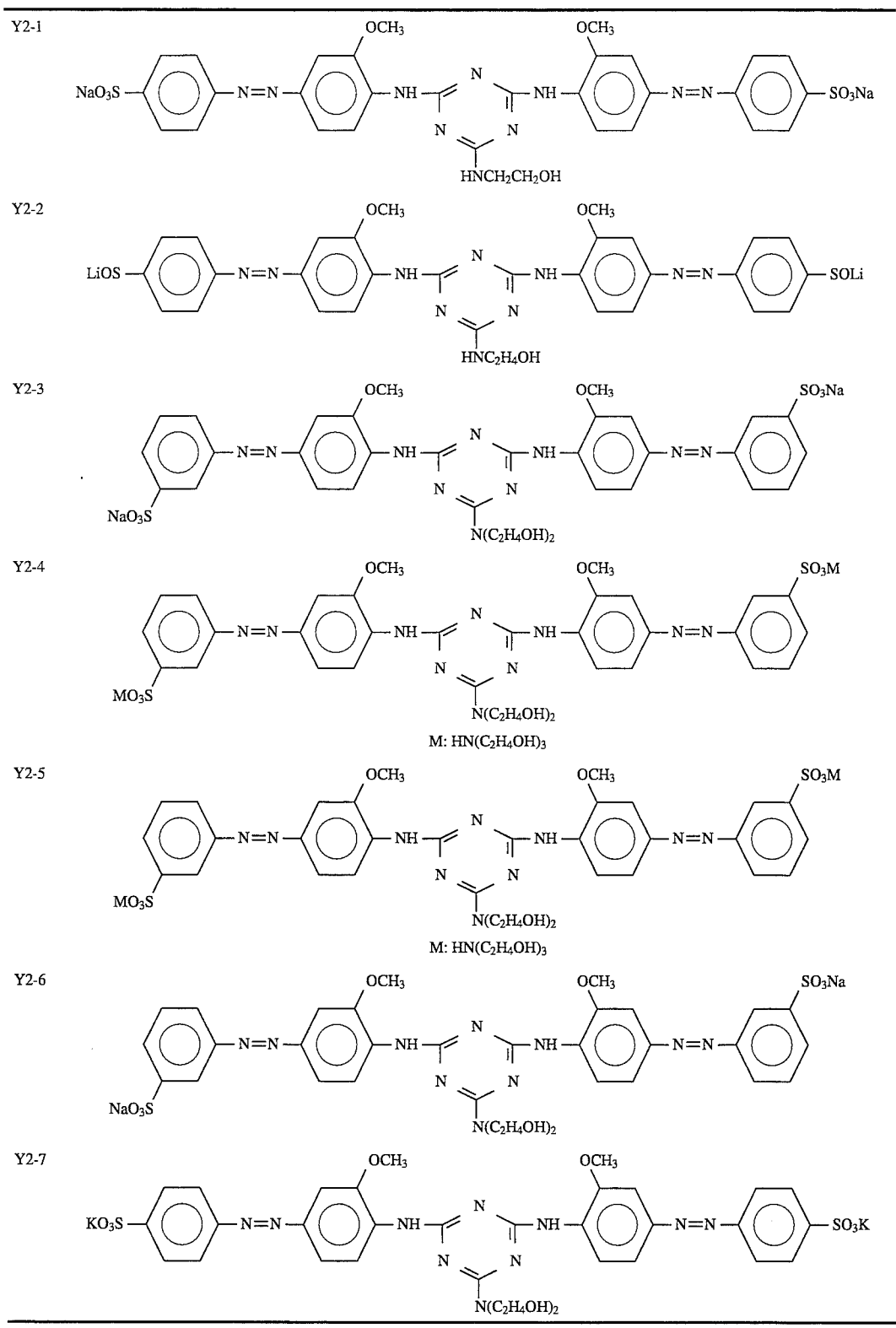

TABLE 4 shows representative examples of the dye dye compound of formula (III) for use in the present invention:

TABLE 4

Y3-1
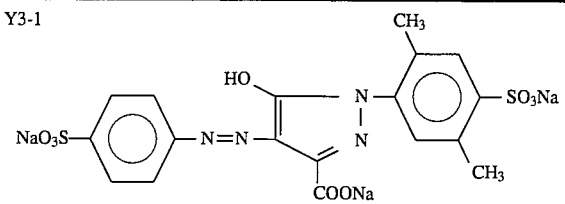

Y3-2
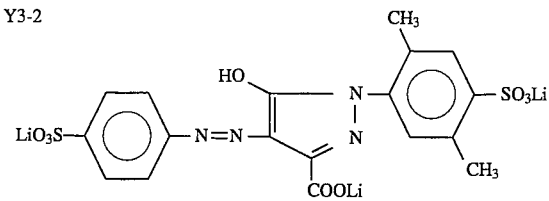

Y3-3
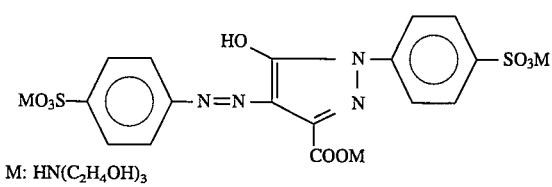

M: $HN(C_2H_4OH)_3$

Y3-4
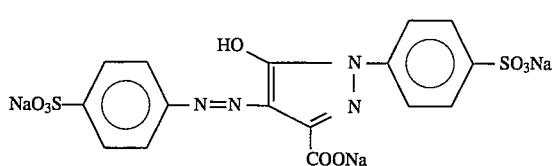

Y3-5
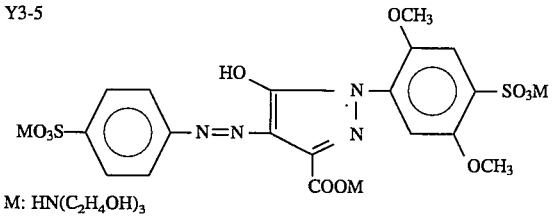

M: $HN(C_2H_4OH)_3$

Y3-6
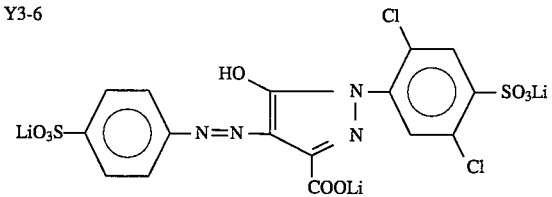

TABLE 5 shows specific examples of an anionic surfactant of formula (IV) or (V) for use in the present invention:

TABLE 5

| No. 1 | $CH_3(CH_2)_{12}O(C_2H_4O)_3CH_2COONa$ |
|---|---|
| No. 2 | $CH_3(CH_2)_{12}O(C_2H_4O)_4CH_2COONa$ |
| No. 3 | $CH_3(CH_2)_{12}O(C_2H_4O)_5CH_2COOLi$ |

TABLE 5-continued

| No. 4 | $CH_3(CH_2)_{12}O(C_2H_4O)_6CH_2COOLi$ |
|---|---|
| No. 5 | $CH_3(CH_2)_{12}O(C_2H_4O)_3CH_2COOM$<br>M: $HN(C_2H_4OH)_3$ |
| No. 6 | $CH_3(CH_2)_{12}O(C_2H_4O)_6CH_2COOM$<br>M: $HN(C_2H_4OH)_3$ |
| No. 7 | $CH_3(CH_2)_{11}\underset{\underset{CH_3}{\mid}}{C}HO(C_2H_4O)_3CH_2COONa$ |
| No. 8 | $CH_3(CH_2)_{11}\underset{\underset{CH_3}{\mid}}{C}HO(C_2H_4O)_6CH_2COOM$ |
| No. 9 | $CH_3(CH_2)_5\underset{\underset{CH_2(CH_2)CH_2}{\mid}}{C}HO(C_2H_4O)_3CH_2COONa$ |
| No. 10 | $CH_3(CH_2)_6\underset{\underset{CH_2(CH_2)CH_2}{\mid}}{C}HO(C_2H_4O)_3CH_2COOM$<br>M: $HN(C_2H_4OH)_3$ |
| No. 11 | $(CH_3)_2CHCHOCOCH_2CHCOOCHCH(CH_3)_2$<br>$\quad\quad\quad\; \mid \quad\quad\quad\quad\;\; \mid \quad\quad\;\; \mid$<br>$\quad\quad(CH_3)_2CH \quad\;\; SO_3Na \;\; CH(CH_3)_2$ |
| No. 12 | $(CH_3)_2CHCH_2CHOCOCH_2CHCOOCHCH_2CH(CH_3)_2$<br>$\quad\quad\quad\quad\quad\;\; \mid \quad\quad\quad\quad\;\; \mid \quad\quad\;\; \mid$<br>$\quad\quad\quad\quad CH_3 \quad\quad\;\; SO_3Na \;\; CH_3$ |
| No. 13 | $CH_3(CH_2)_3CHOCOCH_2CHCOOCH(CH_2)_3CH_3$<br>$\quad\quad\quad\;\; \mid \quad\quad\quad\quad\;\; \mid \quad\quad\;\; \mid$<br>$\quad\quad\quad CH_3 \quad\quad\;\; SO_3Li \;\; CH_3$ |
| No. 14 | $(CH_3)_2CHCH_2CH_2OCOCH_2CHCOOCH_2CH_2CH(CH_3)_2$<br>$\quad\quad\quad\quad\quad\quad\quad\quad\quad\quad\quad\;\; \mid$<br>$\quad\quad\quad\quad\quad\quad\quad\quad\quad\quad SO_3Na$ |
| No. 15 | $CH_3(CH_2)_{12}O(C_2H_4O)_2CH_2COOK$ |

TABLE 6 shows specific examples of a nonionic surfactant of formula (VI) or (VII) for use in the present invention:

TABLE 6

No. 1

$C_9H_{19}$—⌬—$O(CH_2CH_2O)_7H$

No. 2

$C_9H_{19}$—⌬—$O(CH_2CH_2O)_9H$

No. 3

$$CH_3-\underset{\underset{CH_3}{\mid}}{C}H-CH_2-\underset{\underset{O}{\mid}}{\overset{\overset{CH_3}{\mid}}{C}}-C\equiv C-\underset{\underset{O}{\mid}}{\overset{\overset{CH_3}{\mid}}{C}}-CH_2-\underset{\underset{CH_3}{\mid}}{C}H-CH_3$$

$$\underset{H}{\underbrace{(CH_2CH_2O)_5}} \quad \underset{H}{\underbrace{(CH_2CH_2O)_6}}$$

TABLE 6-continued

No. 4

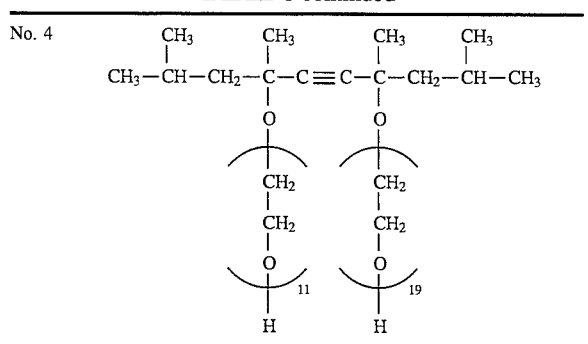

The polyoxyethylene alkyl ether acetate serving as an anionic surfactant is commercially available under a trademark of "Nikkol ECT Series", made by Nihon Surfactant Kogyo K. K.

The dialkylsulfosuccinate is also commercially available under the trademarks of "AIRROL OB-70", made by Toho Chemical Industry Co., Ltd., and "AEROSOL MA-80, AEROSOL AY-100", made by Mitsui Cytec, Ltd.

The polyoxyethylene alkyl phenyl ether serving as a nonionic surfactant is commercially available under the trademark of "Nonipol", made by Sanyo Chemical Industries, Ltd., and the acetylene glycol derivative compound serving as a nonionic surfactant is also commercially available under the trademarks of "Surfynol 465" and "Surfynol 485", made by Air Products & Chemicals Inc.

In the yellow ink composition of the present invention, water is employed as a solvent. In order to prevent the yellow ink composition from drying too quickly, or in order to improve the solubility stability of the ink composition, or in order to adjust the physical properties of the ink composition as desired, a wetting may be added to the ink composition.

Specific examples of such a wetting agent are polyhydric alcohols such as ethylene glycol, diethylene glycol, triethylene glycol, polyethylene glycol, polypropylene glycol, glycerol, 1,5-pentanediol, 1,6-hexanediol, 1,2,6-hexanetriol, 1,2,4-butanetriol 1,2,3-butanetriol, and pentanetriol; alkyl ethers derived from polyhydric alcohols such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylons glycol monoethyl ether; aryl ethers derived from polyhydric alcohols such as ethylene glycol monophenyl ether, and ethylene glycol monobenzyl ether; nitrogen-containing heterocyclic compounds such as N-methyl-2-pyrrolidone, N-hydroxyethyl-2-pyrrolidone, 1,3-dimethylimidazolidinone, and ε-caprolactam; amides such as formamide, N-methylformamide, and N,N-dimethylformamide; amines such as monoethanol amine, diethanol amine, triethanol amine, monoethylamine, diethyl amine, and triethyl amine; sulfur-containing compounds such as dimethyl sulfoxide, sulfolane, and thiodiethanol; propylene carbonate; ethylene carbonate; and v-butyrolactam. These wetting agents can be employed alone or in combination when used together with water.

Of the above-mentioned wetting agents, triethyelene glycol is particularly suitable for improving the solubility stability of the dye compound of formula (I).

Furthermore, triethylene glycol has substantially no adverse effects on the nozzles and other parts of an ink jet printing apparatus when it comes into contact therewith.

By the addition of triethylene glycol to the yellow ink composition, the preservation stability and ejection stability thereof can be significantly improved.

Furthermore, by the addition of triethylene glycol, the plugging of the nozzles of the ink jet printing apparatus can be prevented since the deposition of solid components in the ink composition due to the evaporation of water therefrom can be minimized.

Furthermore, by the addition of triethylene glycol, the concentration of the dye compounds in the yellow ink composition can be increased, so that printed images with high density can be obtained in a stable manner.

It is preferable that the amount of triethylene glycol be in the range of 1 to 80 wt. % of the entire weight of the wetting agent employed in the ink composition to attain sufficient solubility stability of the dye compounds, preservation stability, and ejection stability of the ink composition, and also to obtain excellent printing quality.

In the present invention, in order to increase the penetration performance of the yellow ink composition thereof into paper, a penetrating agent can also employed in addition to the above-mentioned surfactants:

Specific examples of the penetrating agent are alkyl and aryl ethers derived from polyhydric alcohols such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, tetraethylene glycol chlorophenyl ether; fluorine-containing surfactants; acetylene surfactants; lower alcohols such as ethanol and 2-propanol.

In particular, diethylene glycol monobutyl ether is preferably employed.

The yellow ink composition of the present invention may further contain conventionally known additives. For instance, sodium dehydroacetate, sodium sorbate, sodium 2-pyridinethiol-1-oxide, sodium benzoate, and sodium pentachlorophenol can be employed as antiseptic agents.

Furthermore, a corrosion inhibitor may also be added to the ink composition of the present invention.

Examples of the corrosion inhibitor are acid sulfite, sodium thiosulfate, ammon thiodiglycollic acid, diisopropyl ammonium nits-its, pentaerythritol tetranitrate, and dicyclohexyl ammonium nitrite.

Furthermore, when necessary, a water-soluble ultraviolet absorbing agent and a water-soluble infrared absorbing agent can be employed.

In the present invention, by setting the pH of the yellow ink composition of the present invention in the range of 7 to 11, high preservation stability can be obtained, so that stable ejection of the ink composition can be attained even when ink jet printing is continuously performed for an extended period of time, or ink jet printing is resumed after a long non-use period.

However, in the case where the dialkylsulfosuccinate of formula (V) is used as a surfactant in a yellow ink composition with the pH thereof being 9 or more, the dialkylsulfosuccinate tends to be decomposed, so that it is preferable that the pH of the yellow ink composition be set in the range of 7 to 9 when this surfactant is employed.

Most of copy papers and other recording papers used in offices have a pH of 5 to 6, and when the yellow ink composition of the present invention is ejected in the form of droplets by thermal energy or mechanical energy, for instance, from a nozzle with an ejection diameter of 20 to 60 μm at an ejection speed of 5 to 20 m/s, with an ejection amount of 10 ng to 160 ng, onto a sheet of plain paper with a Stöckigt size degree of 3 seconds or more, serving as an image-receiving medium to form images thereon, images with high quality and high resolution can be recorded.

The yellow ink composition of the present invention can be used not for the formation of images with high image quality and high resolution, on an image receiving sheet for ink jet printing, but also for plain paper in general use, and transparent sheets for overhead projector.

Other features of this invention will become apparent in the course of the following description of exemplary embodiments, which are given for illustration of the invention and are not intended to be limiting thereof.

EXAMPLE 1

A mixture of the following components was stirred and dissolved at room temperature:

|  | wt. % |
| --- | --- |
| Water-soluble dye compound (Y1-3) in TABLE 2 | 2.0 |
| Water-soluble dye compound (Y2-4) in TABLE 3 | 1.0 |
| Surfactant No. 5 in TABLE 5 | 1.0 |
| Diethylene glycol | 7.5 |
| Glycerin | 2.5 |
| Deionized water | the balance |

The above mixture was filtered through a Teflon filter with a mesh of 0.22 μm, and was then deaerated for about 30 minutes, whereby a yellow ink composition No. 1 of the present invention was prepared.

EXAMPLE 2

A mixture of the following components was stirred and dissolved at room temperature:

|  | wt. % |
| --- | --- |
| Water-soluble dye compound (Y1-1) in TABLE 2 | 2.5 |
| Water-soluble dye compound (Y3-5) in TABLE 4 | 0.5 |
| Surfactant No. 10 in TABLE 5 | 1.0 |
| Triethylene glycol | 6.0 |
| Glycerin | 2.0 |
| Diethylene glycol | 2.0 |
| Deionized water | the balance |

The above mixture was filtered through a Teflon filter with a mesh of 0.22 μm, and was then deaerated for about 30 minutes, whereby a yellow ink composition No. 2 of the present invention was prepared.

EXAMPLE 3

A mixture of the following components was stirred and dissolved at room temperature:

|  | wt. % |
| --- | --- |
| Water-soluble dye compound (Y1-2) in TABLE 2 | 1.5 |
| Water-soluble dye compound (Y2-3) in TABLE 3 | 1.0 |
| Water-soluble dye compound (Y3-1) in TABLE 4 | 0.5 |
| Surfactant No. 6 in TABLE 5 | 1.0 |
| Diethylene glycol | 8.0 |
| Glycerin | 2.0 |
| Deionized water | the balance |

The above mixture was filtered through a Teflon filter with a mesh of 0.22 μm, and was then deaerated for about 30 minutes, whereby a yellow ink composition No. 3 of the present invention was prepared.

EXAMPLE 4

A mixture of the following components was stirred and dissolved at room temperature:

|  | wt. % |
| --- | --- |
| Water-soluble dye compound (Y1-4) in TABLE 2 | 1.5 |
| Water-soluble dye compound (Y2-3) in TABLE 3 | 1.5 |
| Surfactant No. 8 in TABLE 5 | 1.0 |
| Diethylene glycol | 5.0 |
| Glycerin | 2.0 |
| 1,5-pentanediol | 3.0 |
| Deionized water | the balance |

The above mixture was filtered through a Teflon filter with a mesh of 0.22 μm, and was then deaerated for about 30 minutes, whereby a yellow ink composition No. 4 of the present invention was prepared.

EXAMPLE 5

A mixture of the following components was stirred and dissolved at room temperature:

|  | wt. % |
| --- | --- |
| Water-soluble dye compound (Y1-5) in TABLE 2 | 1.5 |
| Water-soluble dye compound (Y2-6) in TABLE 3 | 1.0 |
| Water-soluble dye compound (Y3-2) in TABLE 4 | 0.5 |
| Surfactant No. 12 in TABLE 5 | 1.0 |
| Diethylene glycol | 6.0 |
| Glycerin | 2.0 |
| Triethylene glycol | 2.0 |
| Deionized water | the balance |

The above mixture was filtered through a Teflon filter with a mesh of 0.22 μm, and was then deaerated for about 30 minutes, whereby a yellow ink composition No. 5 of the present invention was prepared.

EXAMPLE 6

A mixture of the following components was stirred and dissolved at room temperature:

|  | wt. % |
| --- | --- |
| Water-soluble dye compound (Y1-3) in TABLE 2 | 2.0 |
| Water-soluble dye compound (Y2-6) in TABLE 3 | 0.5 |
| Water-soluble dye compound (Y3-3) in TABLE 4 | 0.5 |
| Surfactant No. 9 in TABLE 5 | 1.0 |
| Triethylene glycol | 6.0 |
| Glycerin | 2.0 |
| 1,5-pentanediol | 2.0 |
| Deionized Water | the balance |

The above mixture was filtered through a Teflon filter with a mesh of 0.22 μm, and was then deaerated for about 30 minutes, whereby a yellow ink composition No. 6 of the present invention was prepared.

EXAMPLE 7

A mixture of the following components was stirred and dissolved at room temperature:

|  | wt. % |
| --- | --- |
| Water-soluble dye compound (Y1-8) in TABLE 2 | 1.5 |
| Water-soluble dye compound (Y2-5) in TABLE 3 | 1.5 |
| Surfactant No. 1 in TABLE 6 | 1.0 |
| Diethylene glycol | 7.0 |
| Glycerin | 3.0 |
| Urea | 1.0 |
| Deionized water | the balance |

The above mixture was filtered through a Teflon filter with a mesh of 0.22 μm, and was then deaerated for about 30 minutes, whereby a yellow ink composition No. 7 of the present invention was prepared.

EXAMPLE 8

A mixture of the following components was stirred and dissolved at room temperature:

|  | wt. % |
| --- | --- |
| Water-soluble dye compound (Y1-7) in TABLE 2 | 2.5 |
| Water-soluble dye compound (Y3-5) in TABLE 4 | 0.5 |
| Surfactant No. 3 in TABLE 6 | 2.0 |
| Glycerin | 2.0 |
| Triethylene glycol | 8.0 |
| Hydroxyethyl urea | 0.5 |
| Deionized water | the balance |

The above mixture was filtered through a Teflon filter with a mesh of 0.22 μm, and was then deaerated for about 30 minutes, whereby a yellow ink composition No. 8 of the present invention was prepared.

EXAMPLE 9

A mixture of the following components was stirred and dissolved at room temperature:

|  | wt. % |
| --- | --- |
| Water-soluble dye compound (Y1-9) in TABLE 2 | 1.5 |
| Water-soluble dye compound (Y2-7) in TABLE 3 | 1.5 |
| Surfactant No. 8 in TABLE 5 | 1.0 |
| Diethylene glycol | 5.0 |
| Glycerin | 2.0 |
| 1,5-pentanediol | 3.0 |
| Deionized water | the balance |

The above mixture was filtered through a Teflon filter with a mesh of 0.22 μm, and was then deaerated for about 30 minutes, whereby a yellow ink composition No. 9 of the present invention was prepared.

EXAMPLE 10

A mixture of the following components was stirred and dissolved at room temperature:

|  | wt. % |
| --- | --- |
| Water-soluble dye compound (Y1-8) in TABLE 2 | 1.5 |
| Water-soluble dye compound (Y2-5) in TABLE 3 | 1.5 |
| Surfactant No. 1 in TABLE 6 | 1.0 |
| Diethylene glycol | 7.0 |
| Glycerin | 3.0 |
| Deionized water | the balance |

The above mixture was filtered through a Teflon filter with a mesh of 0.22 μm, and was then deaerated for about 30 minutes, whereby a yellow ink composition No. 10 of the present invention was prepared.

EXAMPLE 11

A mixture of the following components was stirred and dissolved at room temperature:

|  | wt. % |
| --- | --- |
| Water-soluble dye compound (Y1-7) in TABLE 2 | 2.5 |
| Water-soluble dye compound (Y3-5) in TABLE 4 | 0.5 |
| Surfactant No. 3 in TABLE 6 | 2.0 |
| Glycerin | 2.0 |
| Triethylene glycol | 8.0 |
| Deionized water | the balance |

The above mixture was filtered through a Teflon filter with a mesh of 0.22 μm, and was then deaerated for about 30 minutes, whereby a yellow ink composition No. 11 of the present invention was prepared.

EXAMPLE 12

A mixture of the following components was stirred and dissolved at room temperature:

|  | wt. % |
| --- | --- |
| Water-soluble dye compound (Y1-1) in TABLE 2 | 2.0 |
| Water-soluble dye compound (Y2-3) in TABLE 3 | 1.0 |
| Surfactant No. 8 in TABLE 5 | 1.0 |
| Glycerin | 2.0 |
| Triethylene glycol | 8.0 |
| Deionized water | the balance |

The above mixture was filtered through a Teflon filter with a mesh of 0.22 μm, and was then deaerated for about 30 minutes, whereby a yellow ink composition No. 12 of the present invention was prepared.

COMPARATIVE EXAMPLE 1

A mixture of the following components was stirred and dissolved at room temperature:

|  | wt. % |
| --- | --- |
| Water-soluble dye compound (Y1-3) in TABLE 2 | 3.0 |
| Surfactant No. 5 in TABLE 5 | 1.0 |
| Diethylene glycol | 7.5 |
| Glycerin | 2.5 |
| Deionized water | the balance |

The above mixture was filtered through a Teflon filter with a mesh of 0.22 μm, and was then deaerated about 30 minutes, whereby a comparative yellow ink composition No. 1 was prepared.

COMPARATIVE EXAMPLE 2

A mixture of the following components was stirred and dissolved at room temperature:

|  | wt. % |
| --- | --- |
| Water-soluble dye comyound (Y1-3) in TABLE 2 | 3.0 |
| Surfactant No. 10 in TABLE 5 | 1.0 |
| Triethylene glycol | 6.0 |
| Glycerin | 2.0 |
| Diethylene glycol | 2.0 |
| Deionized water | the balance |

The above mixture was filtered through a Teflon filter with a mesh of 0.22 μm, and was then deaerated for about 30 minutes, whereby a comparative yellow ink composition No. 2 was prepared.

COMPARATIVE EXAMPLE 3

A mixture of the following components was stirred and dissolved at room temperature:

|  | wt. % |
| --- | --- |
| Water-soluble dye compound (Y2-3) in TABLE 3 | 1.5 |
| Water-soluble dye compound (Y3-1) in TABLE 4 | 1.5 |
| Surfactant No. 10 in TABLE 5 | 1.0 |
| Diethylene glycol | 7.5 |
| Glycerin | 2.5 |
| Deionized water | the balance |

The above mixture was filtered through a Teflon filter with a mesh of 0.22 μm, and was then deaerated for about 30 minutes, whereby a comparative yellow ink composition No. 3 was prepared.

COMPARATIVE EXAMPLE 4

A mixture of the following components was stirred and dissolved at room temperature:

|  | |
| --- | --- |
| Water-soluble dye compound (Y1-5) in TABLE 2 | 1.5 |
| Water-soluble dye compound (Y2-6) in TABLE 3 | 1.0 |
| water-soluble dye conpound (Y3-2) in TABLE 4 | 0.5 |
| (CH$_3$)$_2$CHCH$_2$CH$_2$OCOCH$_2$CHCOOCH$_2$CH$_2$CH(CH$_3$)$_2$<br>                                                     |<br>                                                  SO$_3$NH$_4$<br>(Surfactant) | 1.0 |
| Diethylene glycol | 6.0 |
| Glycerin | 2.0 |
| Triethylene glycol | 2.0 |
| Deionized water | the balance |

The above mixture was filtered through a Teflon filter with a mesh of 0.22 μm, and was then deaerated for about 30 minutes, whereby a comparative yellow ink composition No. 4 was prepared.

COMPARATIVE EXAMPLE 5

A mixture of the following components was stirred and dissolved at room temperature:

|  | wt. % |
| --- | --- |
| Water-soluble dye compound (Y1-3) in TABLE 2 | 2.0 |
| Water-soluble dye compound (Y2-6) in TABLE 3 | 0.5 |
| Water-soluble dye compound (Y3-3) in TABLE 4 | 0.5 |
| Commercially available surfactant (Trademark "BT-7" made by Nikko Chemicals Co., Ltd.) | 1.5 |
| Triethylene glycol | 6.0 |
| Glycerin | 2.0 |
| 1,5-pentanediol | 2.0 |
| Deionized water | the balance |

The above mixture was filtered through a Teflon filter with a mesh of 0.22 μm, and was then deaerated for about 30 minutes, whereby a comparative yellow ink composition No. 5 was prepared.

COMPARATIVE EXAMPLE 6

A mixture of the following components was stirred and dissolved at room temperature:

|  | wt. % |
| --- | --- |
| Water-soluble dye compound (Y1-4) in TABLE 2 | 2.0 |
| Water-soluble dye compound (Y2-2) in TABLE 3 | 1.0 |
| Sodium di(2-ethylhexyl)sulfo-succinate (surfactant) | 1.5 |
| Glycerin | 2.0 |
| Diethylene glycol | 8.0 |
| Deionized water | the balance |

The above mixture was filtered through a Teflon filter with a mesh of 0.22 μm, and was then deaerated for about 30 minutes, whereby a comparative yellow ink composition No. 6 was prepared.

COMPARATIVE EXAMPLE 7

A mixture of the following components was stirred and dissolved at room temperature:

|  | wt. % |
| --- | --- |
| Water-soluble dye compound (Y1-3) in TABLE 2 | 2.0 |
| Water-soluble dye compound (Y2-1) in TABLE 3 | 0.5 |
| Water-soluble dye compound (Y3-2) in TABLE 4 | 0.5 |
| Dodecylbenzenesulfonate | 1.5 |
| Glycerin | 2.0 |
| Diethylene glycol | 8.0 |
| Deionized water | the balance |

The above mixture was filtered through a Teflon filter with a mesh of 0.22 μm, and was then deaerated for about 30 minutes, whereby a comparative yellow ink composition No. 7 was prepared.

COMPARATIVE EXAMPLE 8

A mixture of the following components was stirred and dissolved at room temperature:

|  | wt. % |
| --- | --- |
| Direct Yellow (DY) 120 | 3.0 |
| Surfactant No. 5 in TABLE 5 | 1.0 |
| Glycerin | 2.0 |
| Diethylene glycol | 8.0 |
| Deionized water | the balance |

The above mixture was filtered through a Teflon filter with a mesh of 0.22 μm, and was then deaerated for about 30 minutes, whereby a comparative yellow ink composition No. 8 was prepared.

The yellow ink compositions Nos. 1 to 12 of the present invention, respectively prepared in Examples 1 to 12, and the comparative aqueous ink compositions Nos. 1 to 8, respectively prepared in Comparative Examples 1 to 8 were subjected to the following tests, with the adjustment of the pH thereof in the range of 7 to 11:

(1) Image Clearness Inspection Test:

Each yellow ink composition was separately filled into a thermal ink-jet printer with a head having 300 dpi nozzles and also into an ink-jet printer with 300 dpi nozzles capable of ejecting the ink composition therefrom by the application of pressure thereto by the action of a piezoelectric element of PZT.

In this test, ink jet printing was conducted on three kinds of papers, that is, recycled paper, high quality paper, and bond paper. The image quality of the printed images was evaluated by visual inspection from the viewpoints of the image blurring, color tone and image density.

The results are shown in TABLE 5. In TABLE 5, Mark "O" denotes that clear images with excellent color tone, free from image blurring, were obtained on all of the three kinds of papers; mark "Δ" denotes that slight image blurring was observed and the color tone thereof was unsatisfactory; and mark "x" denotes that the images were not clear and the color tone thereof was no good.

(2) Water Resistance Inspection Test:

A printed-image-bearing sample obtained by use of each of the yellow ink composition was immersed in water at 30° C. for 1 minute, and the image density before the water immersion thereof and that after the water immersion were measured by use of a Macbeth densitomer, and the water resistance of the image obtained by each aqueous ink composition was determined in terms of the fading ratio by percentage:

The results are shown in TABLE 5. Mark "●" denotes that the fading ratio was less than 5%, mark "O" denotes that the fading ratio was 5 to less than 20%; mark "Δ" denotes that the fading ratio was 20% to less than 50%; and mark "x" denotes that the fading ratio was more than 50%.

(3) Light-Resistance Inspection Test:

A printed-image-bearing sample obtained by use of each of the yellow ink compositions was exposed to the light of a carbon arc type fade meter at 63° C. for 3 hours. The image density before the exposure and that after the exposure were measured by use of a Macbeth densitomer, and the light-resistance of the image obtained by each yellow ink composition was determined in terms of the fading ratio by percentage.

The results are shown in TABLE 5. Mark "O" denotes that the fading ratio was less than 3%; mark "Δ" denotes that the fading ratio was 3% to less than 10%; and mark "x" denotes that the fading ratio was 10% or more.

(4) Drying Characteristics Inspection Test:

A sheet of filter paper was brought into pressure contact with the printed image immediately after the images were printed on the above-mentioned three kinds of papers. The drying characteristics of the ink compositions were expressed by the time period from the contact of the filter paper with the printed images until no more images were transferred to the filter paper.

In the case where the ink composition was dried and the transfer of the ink composition to the filter paper was finished within 10 seconds with respect to all the three kinds of papers, the drying characteristics of the ink composition were regarded as excellent, which is indicated by mark "O" in TABLE 5.

(5) Preservation Stability Test:

Four samples of each ink composition were separately placed in a polyethylene container, and allowed to stand at −20° C., 5° C., 20° C. and 70° C. for three months. After the storage of three months, the presence or absence of a precipitate in each sample was visually inspected, and the changes in the physical properties such as the surface tension and viscosity were inspected.

The results are shown in TABLE 5. Mark "O" denotes that no changes in the physical properties were observed and no precipitates were formed under any of the above-mentioned preservation temperature conditions. Mark "Δ" denotes that some changes in the physical properties and/or the formation of precipitates was observed under any of the above-mentioned preservation temperature conditions. Mark "x" denotes that some changes in the physical properties and/or the formation of precipitates were observed under all of the above-mentioned preservation temperature conditions.

(6) Ink-Ejection Performance Reliability Test:

Each ink composition was filled into the ink-jet printer with 300 dpi nozzles capable of ejecting the ink composition therefrom by the application of pressure thereto by the action of a piezoelectric element of PZT.

Printing was continuously carried out without capping the printer head. After some intermission, printing was resumed without cleaning the nozzles. At this moment, the ink-ejecting reliability of each ink composition was evaluated by a permissible intermission time or decapping time (sec.), namely, the time from starting by the printing operation with the nozzles being decapped until the direction in which the ink composition was ejected from one of the decapped nozzles was deviated from its original direction, or by the changes in the weight of the ejected ink droplets. The longer the permissible time, the higher the reliability. The results are shown in TABLE 5.

TABLE 5

|  | Image Clearness | Water Resistance | Light Resistance | Drying characteristics | Preservation Stability | Reliability of Ink-ejection Performance |
|---|---|---|---|---|---|---|
| Ex. 1 | ○ | ○ | ○ | ○ | ○ | 550 |
| Ex. 2 | ○ | ○ | ○ | ○ | ○ | 600 or more |
| Ex. 3 | ○ | ○ | ○ | ○ | ○ | 550 |
| Ex. 4 | ○ | ○ | ○ | ○ | ○ | 500 |
| Ex. 5 | ○ | ○ | ○ | ○ | ○ | 550 |
| Ex. 6 | ○ | ○ | ○ | ○ | ○ | 600 or more |
| Ex. 7 | ○ | ○ | ○ | ○ | ○ | 550 |
| Ex. 8 | ○ | ○ | ○ | ○ | ○ | 500 |
| Ex. 9 | ○ | ○ | ○ | ○ | Δ | 250 |
| Ex. 10 | ○ | ○ | ○ | ○ | Δ | 250 |
| Ex. 11 | ○ | ○ | ○ | ○ | Δ | 250 |
| Ex. 12 | ○ | ○ | ○ | ○ | Δ | 250 |
| Comp. Ex. 1 | ○ | ⊙ | ○ | ○ | x | 200 or less |
| Comp. Ex. 2 | ○ | ⊙ | ○ | ○ | Δ | 250 |
| Comp. Ex. 3 | ○ | x | ○ | ○ | ○ | 450 |
| Comp. Ex. 4 | ○ | ○ | ○ | ○ | x | 250 |
| Comp. Ex. 5 | x | ○ | ○ | ○ | ○ | 400 |
| Comp. Ex. 6 | x | ○ | ○ | ○ | x | 250 |
| Comp. Ex. 7 | Δ | ○ | ○ | ○ | x (Low Temperature) | 400 |
| Comp. Ex. 8 | ○ | Δ | ○ | ○ | x | 400 |

The results shown in TABLE 5 indicate that the yellow ink compositions of the present invention can produce clear printed images with high water resistance and light resistance, and have excellent drying characteristics.

Furthermore, the yellow ink compositions of the present invention are also excellent in the preservation stability and ink-ejection performance reliability.

Japanese Patent Application No. 7-155116 filed May 30, 1995, is hereby incorporated by reference.

What is claimed is:

1. A yellow ink composition for ink jet printing comprising an aqueous solution which comprises:

a water-soluble dye which comprises (a) a dye compound of formula (I),

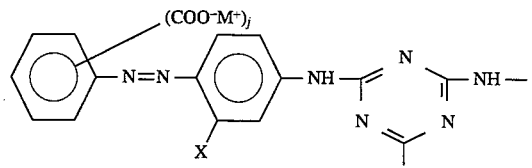

(I)

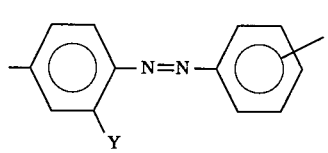

wherein X and Y are each selected from the group consisting of a hydrogen atom, an alkyl group, an alkoxyl group and a halogen; Z is an alkanolamine group; M⁺ is selected from the group consisting of an alkali metal cation, a quaternary ammonium cation, a quaternary phosphonium cation, and an alkanol amine cation; and j and k are each an integer of 0 to 3, and (b) at least one of a dye compound of formula (II)

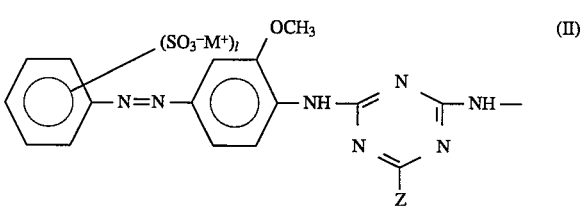

(II)

wherein Z and M⁺ are respectively the same as in formula (I); and l and m are each an integer of 0 to 3, or a dye compound of formula (III)

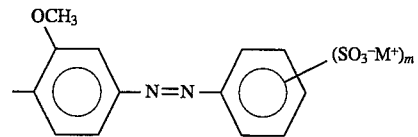

(III)

wherein X, Y and M⁺ are respectively the same as in formula (I), a surfactant, and a wetting agent.

2. The yellow ink composition as claimed in claim 1, wherein said alkali metal cation represented by $M^+$ is a cation selected from the group consisting of $Na^+$ and $Li^+$.

3. The yellow ink composition as claimed in claim 1, wherein said quaternary ammonium cation represented by $M^+$ is a cation represented by formula (1):

wherein $R^1$ to $R^4$ each is selected from the group consisting of a hydrogen atom, an alkyl group having 1 to 4 carbon atoms, and a halogenated alkyl group having 1 to 4 carbon atoms.

4. The yellow ink composition as claimed in claim 1, wherein said alkanolamine cation represented by $M^+$ is a cation represented by formula (2):

wherein at least one of $R^{11}$ to $R^{14}$ is a hydroxyl alkyl group having 1 to 4 carbon atoms, and the other is selected from the group consisting of a hydrogen atom, an alkyl group having 1 to 4 carbon atoms, and a halogenated alkyl group having 1 to 4 carbon atoms.

5. The yellow ink composition as claimed in claim 1, wherein said quaternary phosphonium cation represented by $M^+$ is a cation represented by formula (3):

wherein $R^{21}$ to $R^{24}$ each is selected from the group consisting of a hydrogen atom, an alkyl group having 1 to 4 carbon atoms, a hydroxy alkyl group having 1 to 4 carbon atoms, and a halogenated alkyl group having 1 to 4 carbon atoms.

6. The yellow ink composition as claimed in claim 1, wherein said dye compound of formula (III) is in an amount of 30 wt. % or less of the entire weight of said water-soluble dye.

7. The yellow ink composition as claimed in claim 1, wherein said surfactant is selected from the group consisting of a polyoxyethylene alkyl ether acetate of formula (IV), $$RO(CH_2CH_2O)_nCH_2COO^-M^{+\prime} \quad (IV)$$

wherein R is a straight-chain or branched alkyl group having 13 to 14 carbon atoms, $M^{+\prime}$ is an alkali metal cation, a quaternary ammonium cation, a quaternary phosphonium cation or an alkanolamine cation, and n is an integer of 3 to 12; and a dialkylsulfosuccinate of formula (V),

wherein R' is a straight-chain or branched alkyl group having 5 to 7 carbon atoms, and $M^{+\prime}$ is the same as defined in formula (IV).

8. The yellow ink composition as claimed in claim 7, wherein said alkali metal cation represented by $M^{+\prime}$ is a cation selected from the group consisting of $Na^+$ and $Li^+$.

9. The yellow ink composition as claimed in claim 7, wherein said quaternary ammonium cation represented by $M^{+\prime}$ is a cation represented by formula (1):

wherein $R^1$ to $R^4$ each is selected from the group consisting of a hydrogen atom, an alkyl group having 1 to 4 carbon atoms, and a halogenated alkyl group having 1 to 4 carbon atoms.

10. The yellow ink composition as claimed in claim 7, wherein said alkanolamine cation represented by $M^{+\prime}$ is a cation represented by formula (2):

wherein at least one of $R^{11}$ to $R^{14}$ is a hydroxyl alkyl group having 1 to 4 carbon atoms, and the other is selected from the group consisting of a hydrogen atom, an alkyl group having 1 to 4 carbon atoms, and a halogenated alkyl group having 1 to 4 carbon atoms.

11. The yellow ink composition as claimed in claim 7, wherein said quaternary phosphonium cation represented by $M^{+\prime}$ is a cation represented by formula (3):

wherein $R^{21}$ to $R^{24}$ each is selected from the group consisting of a hydrogen atom, an alkyl group having 1 to 4 carbon atoms, a hydroxy alkyl group having 1 to 4 carbon atoms, and a halogenated alkyl group having 1 to 4 carbon atoms.

12. The yellow ink composition as claimed in claim 1, wherein said surfactant is selected from the group consisting of a compound of formula (VI),

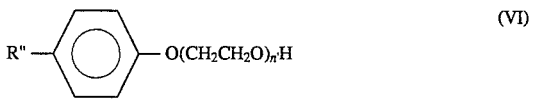

wherein R" is a straight-chain or branched alkyl group having 6 to 14 carbon atoms, and n' is an integer of 5 to 12; and a compound of formula (VII),

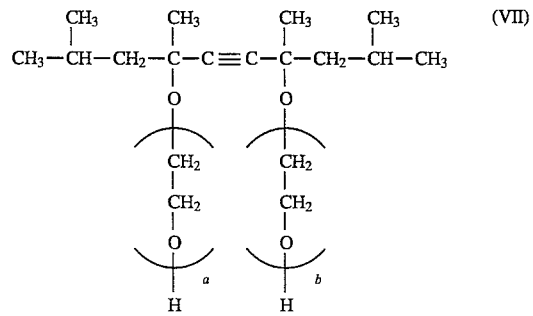

wherein a and b are each an integer of 0 to 40.

13. The yellow ink composition as claimed in claim 12, further comprising at least one of urea or an urea derivative.

14. The yellow ink composition as claimed in claim 1, wherein said wetting agent comprises triethylene glycol in an amount of 1 to 80 wt. % of the entire weight of said wetting agent.

15. The yellow ink composition as claimed in claim 1, having a pH of 7 to 11.

16. The yellow ink composition as claimed in claim 6, having a pH of 7 to 11.

17. The yellow ink composition as claimed in claim 7, having a pH of 7 to 11.

18. The yellow ink composition as claimed in claim 12, having a pH of 7 to 11.

19. The yellow ink composition as claimed in claim 13, having a pH of 7 to 11.

20. The yellow ink composition as claimed in claim 14, having a pH of 7 to 11.

21. A method of recording images on an image receiving medium, comprising the step of ejecting a yellow ink composition in the form of droplets by the application of thermal or mechanical energy thereto onto an image receiving medium with a Stöckigt size degree of 3 seconds or more, with said yellow ink composition comprising an aqueous solution which comprises:

a water-soluble dye which comprises (a) a dye compound of formula (I),

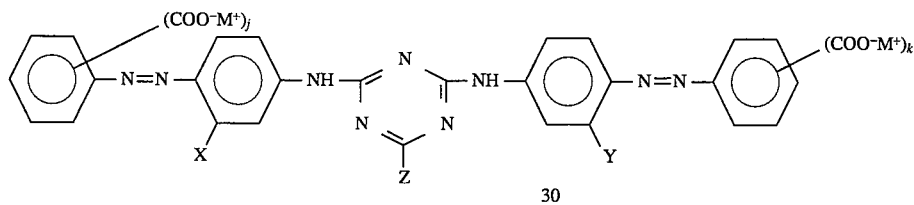

wherein X and Y are each selected from the group consisting of a hydrogen atom, an alkyl group, an alkoxyl group and a halogen; Z is an alkanolamine group; $M^+$ is selected from the group consisting of an alkali metal cation, a quaternary ammonium cation, a quaternary phosphonium cation, and an alkanol amine cation; and j and k are each an integer of 0 to 3, and (b) at least one of a dye compound of formula (II)

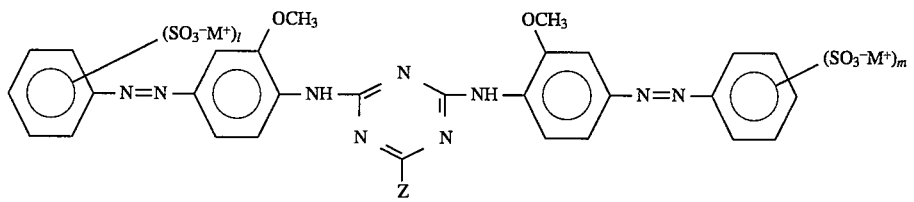

wherein Z and $M^+$ are respectively the same as in formula (I); and l and m are each an integer of 0 to 3, or a dye compound of formula (III)

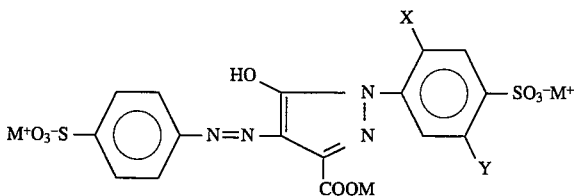

wherein X, Y and $M^+$ are respectively the same as in formula (I), a surfactant, and a wetting agent.

22. The method as claimed in claim 21, wherein said alkali metal cation represented by $M^+$ in said yellow ink composition is a cation selected from the group consisting of $Na^+$ and $Li^+$.

23. The method as claimed in claim 21, wherein said quaternary ammonium cation represented by $M^+$ in said yellow ink composition is a cation represented by formula (1):

wherein $R^1$ to $R^4$ each is selected from the group consisting of a hydrogen atom, an alkyl group having 1 to 4 carbon atoms, and a halogenated alkyl group having 1 to 4 carbon atoms.

24. The method as claimed in claim 21, wherein said alkanolamine cation represented by $M^+$ in said yellow ink composition is a cation represented by formula (2):

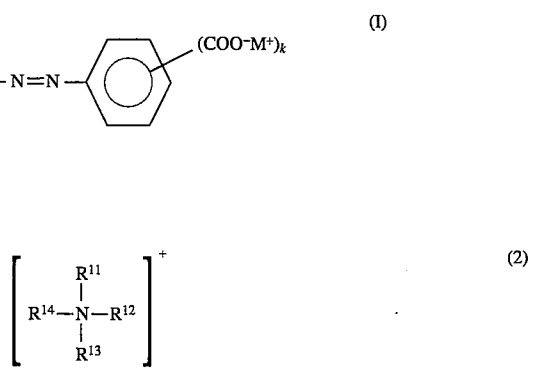

wherein at least one of $R^{11}$ to $R^{14}$ is a hydroxyl alkyl group having 1 to 4 carbon atoms, and the other is selected from the group consisting of a hydrogen atom, an alkyl group having 1 to 4 carbon atoms, and a halogenated alkyl group having 1 to 4 carbon atoms.

25. The method as claimed in claim 21, wherein said quaternary phosphonium cation represented by $M^+$ in said yellow ink composition is a cation represented by formula (3):

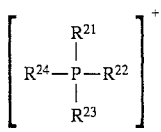 (3)

wherein $R^{21}$ to $R^{24}$ each is selected from the group consisting of a hydrogen atom, an alkyl group having 1 to 4 carbon atoms, a hydroxy alkyl group having 1 to 4 carbon atoms, and a halogenated alkyl group having 1 to 4 carbon atoms.

26. The method as claimed in claim 21, wherein said dye compound of formula (III) in said yellow ink composition is in an amount of 30 wt. % or less of the entire weight of said water-soluble dye.

27. The method as claimed in claim 21, wherein said surfactant in said yellow ink composition is selected from the group consisting of a polyoxyethylene alkyl ether acetate of formula (IV), $$RO(CH_2CH_2O)_nCH_2COO^-M^{+'} \quad (IV)$$

wherein R is a straight-chain or branched alkyl group having 13 to 14 carbon atoms, $M^{+'}$ is an alkali metal cation, a quaternary ammonium cation, a quaternary phosphonium cation or an alkanolamine cation, and n is an integer of 3 to 12; and a dialkylsulfosuccinate of formula (V),

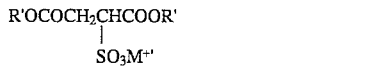 (V)

wherein R' is a straight-chain or branched alkyl group having 5 to 7 carbon atoms, and $M^{+'}$ is the same as defined in formula (IV).

28. The method as claimed in claim 21, wherein said surfactant in said yellow ink composition is selected from the group consisting of a compound of formula (VI),

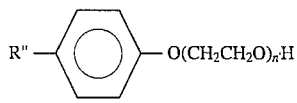 (VI)

wherein R" is a straight-chain or branched alkyl group having 6 to 14 carbon atoms, and n' is an integer of 5 to 12; and a compound of formula (VII),

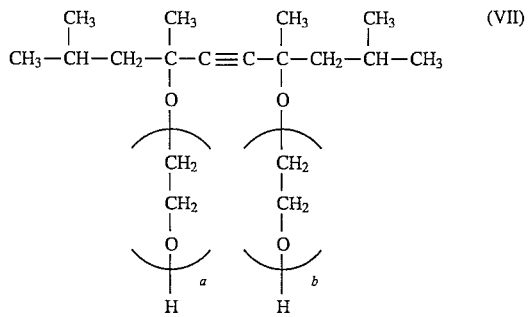 (VII)

wherein a and b are each an integer of 0 to 40.

29. The method as claimed in claim 28, wherein said yellow ink composition further comprises at least one of urea or a urea derivative.

30. The method as claimed in claim 21, wherein said wetting agent in said yellow ink composition comprises triethylene glycol in an amount of 1 to 80 wt. % of the entire weight of said wetting agent.

31. The method as claimed in claim 21, wherein said yellow ink composition has a pH of 7 to 11.

* * * * *